Nov. 26, 1929.   F. A. STEVENS ET AL   1,736,954
SPECTACLE TEMPLE
Original Filed May 15, 1922

Inventors
Frederick A. Stevens
James W. Welsh

By David Rines
Attorney

Patented Nov. 26, 1929

1,736,954

UNITED STATES PATENT OFFICE

FREDERICK A. STEVENS AND JAMES W. WELSH, OF PROVIDENCE, RHODE ISLAND, ASSIGNORS TO BAUSCH AND LOMB OPTICAL COMPANY, OF ROCHESTER, NEW YORK, A CORPORATION OF NEW YORK

SPECTACLE TEMPLE

Original application filed May 15, 1922, Serial No. 560,954. Divided and this application filed October 24, 1927. Serial No. 228,283.

The present invention relates to ophthalmic mountings or eyeglasses, and more particularly to spectacle temples. The present application is a division of a copending application, Serial No. 560,954, filed May 15, 1922, which matured on January 15, 1929 into Letters Patent No. 1,699,080.

Figure 1:
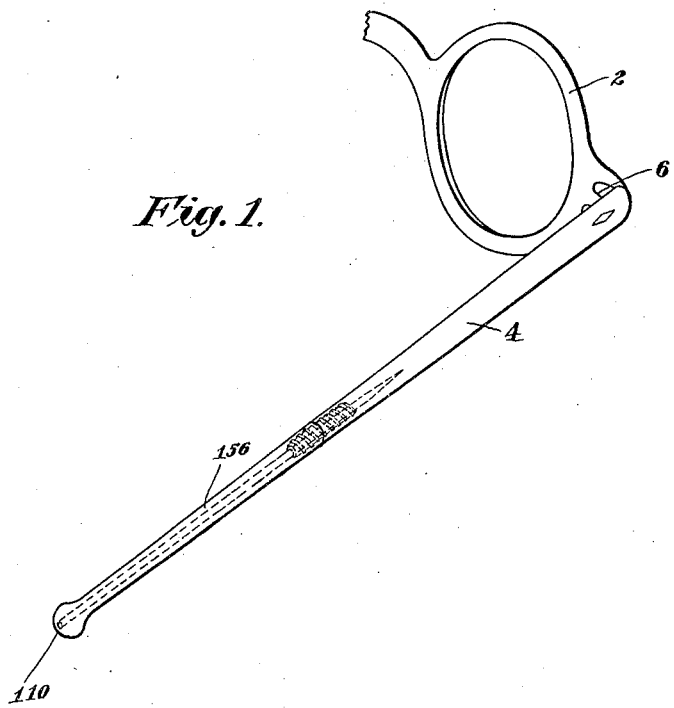
Figure 2:
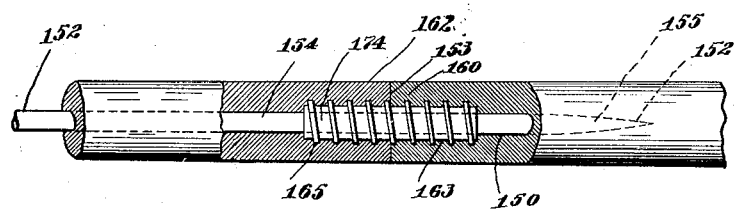

In the accompanying drawings, Fig. 1 is a view of a spectacle temple constructed according to an embodiment of the present invention, and shown hinged to a lens frame; and Fig. 2 is a fragmentary longitudinal section upon a larger scale.

The temple of the present invention is, for the most part, constituted of plastic, non-metallic material, like celluloid, zylonite or other composition. In order to avoid circumlocution of language, such material will hereinafter be referred to under the single term "celluloid". The outer surface of the temple tapers from its larger or forward end towards its rear end of smaller diameter and its sides are flattened. It is shown pivotally connected or secured at its forward or front end to a lens-holding, eyeglass frame 2 by a hinge 6. Spectacle or eyeglass temple bars of this type are in common use, but are comparatively heavy and clumsy, and rather thick at the rear ends to provide the necessary rigidity for holding the temple in place behind the ear. This is particularly true of skull temples, for the rear ends of skull temples are designed to engage, and hold firmly against, the skull, and this they can not do unless the non-metallic material is thick and of substantial proportions.

According to the invention described and claimed in the above-named Letters Patent, however, the thickness of the rear end of the temple may be made small compared to that of the forward end, the required rigidity being attained by the use of a metal reinforcing or strengthening member 154, shown as a flexible metal wire or core. To this end, the main body portion 4 of the temple bar extends throughout a substantial length of the temple, and is longitudinally bored or recessed for a relatively short distance at 150 from the rear end towards the forward end, and interiorly screw threaded at 163.

The longitudinal bore 150 is approximately of uniform dimension to start with, but the forward end 155 of the reinforcing rod 154 is sharp pointed, as shown. This sharp-pointed rod 154 is forced by pressure into the bore 150, becoming thus wedged or anchored or embedded into place, or interlocked with the walls of the bore or recess 150, and automatically rendering the forward portion 152 of the final bore 150 of reduced dimension. To facilitate this forcing or wedging process, the temple is originally cut away at 153, so as to provide a comparatively small bore 150, permitting the rod 154 to be gripped very much closer to the end 155 of the rod while it is wedged into position. The rear portion of the rod 154 is thus caused to extend rearwardly from the rear end of the main body portion 4 in which it is secured. An exteriorly threaded, metal, strengthening or reinforcing collar or barrel 174 is then mounted over the rod 154 and threaded into the interior screw-threads of the rear end 160 of the member 4. A comparatively long, non-metallic flexible tube 156 of comparatively small cross-dimension is then mounted over or about substantially the entire length of the rearward projecting portion 158 of the rod 154 to surround and cover it. The forward end of the tube 156 is interiorly screw threaded at 165 so that it may be screwed upon the barrel 174 of the temple. The free end of the bore of the tube 156 may be plugged with a non-metallic plug 110, effectually concealing the reinforcing rod. The plug 110 may be integrally secured to the tube 156, as by the use of a solvent, or in any other desired manner. The temple may be bent or curved into any desired temple shape, as illustrated, such as the ear-hook or skull shape, so as to extend over the ear of the wearer.

The forward or butt portion of the resulting temple is rigid, the rear portion being flexible by comparison. Temples of this type, as hitherto constructed, have been very weak at the junction 153 between the rear end 160 of the butt or main body portion 4, and the forward end 162 of the rear portion 156. The collar or barrel 174 serves to strengthen the temple at this weak junction, reinforcing or protecting the rod 154 at the point 153.

Many modifications may be made by persons skilled in the art within the spirit and scope of the invention, as defined in the appended claims.

What is claimed is:

1. A spectacle temple comprising a non-metallic member adapted to be hinged at the forward end and having a rearward projecting metal member, non-metallic material mounted over the rearward projecting metal member, and a separate metal tube mounted over the metal member and extending into the rear end of the non-metallic member and the forward end of the non-metallic material for strengthening the joint between the non-metallic member and the non-metallic material.

2. A spectacle temple comprising a non-metallic member adapted to be hinged at the forward end and having a rearward projecting metal member, a non-metallic member mounted over the rearward projecting portion of the metal member, and an exteriorly screw-threaded tube mounted over the metal member and screw threaded into the rear end of the first-named non-metallic member and the forward end of the second-named non-metallic member for strengthening the joint between the non-metallic members.

3. A spectacle temple comprising a forward comparatively rigid non-metallic body portion of comparatively large cross-dimension bored at its rear end and adapted to be hinged at the forward end, a metal member mounted in the bore and projecting rearward beyond the body portion, a non-metallic member of comparatively small cross-dimension mounted over the rearward projecting portion of the metal member, and a metal tube mounted over the metal member and extending into the rear end of the body portion and the forward end of the non-metallic member to strengthen the temple at the junction between the body portion and the non-metallic member.

4. A spectacle temple comprising a non-metallic member adapted to be hinged at the forward end and having a rearward projecting metal rod, a non-metallic member mounted over the rearward projecting metal rod, and means extending into the non-metallic members for reinforcing the rod at the junction between the non-metallic members.

5. A spectacle temple comprising a non-metallic member adapted to be hinged at the forward end and bored at its rear end, a metal member mounted in the bore and projecting rearward beyond the bore, a non-metallic member mounted over the rearward projecting portion of the metal member, and a separate metal tube mounted on the metal member and extending into the non-metallic members.

6. A spectacle temple comprising a comparatively rigid non-metallic portion joined to comparatively flexible non-metallic portion, the temple having a reinforcing rod, and a reinforcing tube mounted over the rod at the junction between the comparatively rigid portion and the comparatively flexible portion.

7. A spectacle temple comprising a forward comparatively rigid non-metallic body portion, a comparatively flexible non-metallic ear-hook portion extending rearward from the rear end of the body portion, the temple having a metal rod in the body portion and extending into the ear-hook portion, and a separate metal tube mounted over the rod at the junction between the body portion and the ear-hook portion and extending into the body portion and the ear-hook portion.

8. A spectacle temple comprising a forward body portion in the form of a solid bar of celluloid extending throughout a substantial length of the temple and provided in its rear end with a relatively short longitudinally extending bore, a celluloid ear-hook portion joined to and extending rearward from the rear end of the body portion, a metal rod in the ear-hook portion extending substantially throughout the entire length thereof and extending into the relatively short bore, and a metal tube mounted about the rod at the junction between the body portion and the ear-hook portion.

9. A spectacle temple comprising a forward comparatively rigid celluloid body portion, a comparatively flexible celluloid ear-hook portion extending rearward from the rear end of the body portion, a comparatively flexible metal rod in the ear-hook portion extending substantially throughout the entire length thereof and entering the rear end of the main body portion, whereby the ear-hook portion of the temple is flexible compared to the body portion, and a metal reinforcing tube positioned about the metal rod within a part of the ear-hook portion immediately adjacent to the rear end of the main body portion, the reinforcing tube extending also into the rear end of the main body portion.

10. A spectacle temple comprising a forward comparatively rigid celluloid body portion, a comparatively flexible celluloid ear-hook portion extending rearward from the rear end of the body portion, a comparatively flexible metal rod in the ear-hook portion extending substantially throughout the entire length thereof and entering the rear end of the main body portion, whereby the ear-hook portion of the temple is flexible compared to the body portion, and a metal reinforcing tube positioned about the metal rod within a part of the ear-hook portion immediately adjacent to the rear end of the main body portion, the reinforcing tube extending also into the rear end of the main body portion and having in its surface irregularities interengaging with the celluloid thereof.

11. A spectacle temple comprising a forward comparatively rigid non-metallic body portion of comparatively large cross-dimension bored at its rear end and adapted to be hinged at the forward end, a metal member mounted in the bore and projecting rearward beyond the body portion, a non-metallic member of comparatively small cross-dimension mounted over the rearward projecting portion of the metal member, and a metal tube mounted over the metal member and extending into the rear end of the body portion and the forward end of the non-metallic member to strengthen the temple at the junction between the body portion and the non-metallic member, the metal tube having in its surface irregularities interlocking with the non-metallic material of the body portion.

12. A spectacle temple comprising a forward body portion in the form of a solid bar of celluloid extending throughout a substantial length of the temple and provided in its rear end with a relatively short longitudinally extending bore, a celluloid ear-hook portion joined to and extending rearward from the rear end of the body portion, a metal rod in the ear-hook portion extending substantially throughout the entire length thereof and extending into the relatively short bore, and a separate metal tube mounted about the rod at the junction between the body portion and the ear-hook portion, the metal tube extending into the bore of the body portion and the forward end of the celluloid ear-hook portion and having in its surface irregularities interengaging with the celluloid walls of the bore of the body portion.

13. A spectacle temple comprising a comparatively rigid forward portion joined to a comparatively flexible rear portion, said rear portion including a flexible metal member extending into the forward portion, and a stiffening metal sleeve positioned about the part of said metal member at the junction between the forward portion and the rear portion.

14. A spectacle temple comprising a non-metallic member adapted to be hinged at the forward end and having a rearward projecting metal member, non-metallic material mounted over the rearward projecting metal member, and a strengthening member mounted over the metal member and extending into the rear end of the non-metallic member and the forward end of the non-metallic material for strengthening the joint between the non-metallic member and the non-metallic material, the strengthening member being provided with means for biting into the non-metallic member and the non-metallic material.

In testimony whereof, we have hereunto subscribed our names this 21st day of October, 1927.

FREDERICK A. STEVENS.
JAMES W. WELSH.